UNITED STATES PATENT OFFICE.

CHARLES RÉPIN, OF PARIS, FRANCE.

PROCESS OF TREATING INDIA-RUBBER, GUTTA-PERCHA, &c.

SPECIFICATION forming part of Letters Patent No. 632,022, dated August 29, 1899.

Application filed December 16, 1898. Serial No. 699,501. (No specimens.)

*To all whom it may concern:*

Be it known that I, CHARLES RÉPIN, a citizen of the Republic of France, residing at Paris, France, have invented a certain new and useful Improvement in Processes of Treating India-Rubber, Gutta-Percha, and other Elastic Substances, of which the following is a specification.

My invention consists in utilizing the property of the oil expressed out of seeds of *Elæococea vernicifera* (named in China "tong-oil" and in English "wood-oil") of becoming converted into a solid and elastic mass when heated for a few minutes at a temperature of 250° centigrade without it being necessary to add any foreign matter thereto. I apply this property for producing artificial rubber to be employed as an admixture to rubber, gutta-percha, and the like. For this purpose I gradually heat wood-oil until it reaches the temperature of 250° centigrade, when it becomes solidified and assumes the shape of the vessel which contains it.

I have found that any oil, either vegetable, animal, or mineral, may be added to the wood-oil in a proportion which reaches 50 per cent. without preventing solidification. I may further state that any substance adapted to be dissolved in oil without altering the chemical composition thereof, and especially the greatest part of hydrocarbons, may be employed for admixture.

All kinds of oils, and even substances which are not oils, but are soluble therein—such as nitrobenzin, for instance—may be added to the wood-oil. The most suitable oils for such admixture are those that are distilled at 250° Celsius and above and that have greater density, lighter color, and lower price than wood-oil, such as resin-oil, seed-oil, corn-oil, fish-oil, and oils extracted from petroleum. The object of this admixture is not only to lower the price of production, but also to prevent the product from hardening, as when wood-oil is employed in a pure state. On the contrary, alkaline and acid substances hinder the coagulation when added in sufficient amount.

Artificial rubber produced in accordance with the principle evolved by this invention may be incorporated with india-rubber, gutta-percha, and the like in the same kind as used for other artificial rubber. The pulverization is greatly facilitated by previously impregnating the substance with a liquid hydrocarbon, such as petroleum, which swells it and renders it more friably without dissolving it. After the evaporation of the hydrocarbon the substance returns to its original state, and may be readily mixed with india-rubber, &c., in the form of a powder.

Having fully described my invention, what I claim, and desire to secure by Letters Patent, is—

1. A new and improved method of producing artificial rubber which consists in raising wood-oil to a suitable heat, whereby the same will be coagulated, pulverizing said coagulated or solidified oil in the form of a powder, and incorporating or mixing said powder with india-rubber or the like, substantially as described.

2. A new and improved method of producing artificial rubber which consists in raising wood-oil mixed with another oil having greater density, lighter color, and lower price than wood-oil, to a suitable heat whereby the said mixture will be coagulated, pulverizing said coagulated or solidified mixture in the form of a powder, and incorporating or mixing said powder with india-rubber and the like, substantially as described.

In testimony whereof I have hereunto set my hand, in presence of two subscribing witnesses, this 29th day of November, A. D. 1898.

CHARLES RÉPIN.

Witnesses:
EDWARD P. MACLEAN,
JOHN S. ABERCROMBIE.